United States Patent
Li et al.

(10) Patent No.: US 12,129,621 B2
(45) Date of Patent: Oct. 29, 2024

(54) PLATFORM, SYSTEM AND METHOD FOR SIMULATING CRITICAL ROCK COLLAPSE OF SURROUNDING ROCK IN UNDERGROUND ENGINEERING

(71) Applicant: SHANDONG UNIVERSITY, Shandong (CN)

(72) Inventors: Shucai Li, Jinan (CN); Liping Li, Jinan (CN); Hongliang Liu, Jinan (CN); Zongqing Zhou, Jinan (CN); Shaoshuai Shi, Jinan (CN); Zizheng Sun, Jinan (CN); Shen Zhou, Jinan (CN); Jie Hu, Jinan (CN); Chengshuai Qin, Shandong (CN); Hongyun Fan, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 287 days.

(21) Appl. No.: 17/638,298

(22) PCT Filed: Jul. 10, 2020

(86) PCT No.: PCT/CN2020/101408
§ 371 (c)(1),
(2) Date: Feb. 25, 2022

(87) PCT Pub. No.: WO2021/184608
PCT Pub. Date: Sep. 23, 2021

(65) Prior Publication Data
US 2022/0349147 A1    Nov. 3, 2022

(30) Foreign Application Priority Data
Mar. 18, 2020    (CN) .................. 202010191258.X

(51) Int. Cl.
*E02D 33/00*    (2006.01)
*E21F 17/00*    (2006.01)
(Continued)

(52) U.S. Cl.
CPC .............. *E02D 33/00* (2013.01); *E21F 17/00* (2013.01); *G01M 7/08* (2013.01);
(Continued)

(58) Field of Classification Search
CPC .......... E02D 33/00; E21F 17/00; G01M 7/08; G01M 17/0078; G01N 3/30; G01N 3/307; G01N 3/303
(Continued)

(56) References Cited

U.S. PATENT DOCUMENTS

| | | |
|---|---|---|
| 9,989,671 B2 | 6/2018 | Li et al. |
| 10,408,718 B2 | 9/2019 | Zhang et al. |

(Continued)

FOREIGN PATENT DOCUMENTS

| | | | |
|---|---|---|---|
| CN | 1696417 A | * | 11/2005 |
| CN | 100535267 C | * | 9/2009 |

(Continued)

OTHER PUBLICATIONS

Dec. 16, 2020 International Search Report issued in International Patent Application No. PCT/CN2020/101408.
(Continued)

*Primary Examiner* — Stephanie E Bloss
*Assistant Examiner* — Kevin C Butler
(74) *Attorney, Agent, or Firm* — Oliff PLC

(57) ABSTRACT

A platform, system, and method for simulating critical rock collapse of surrounding rock in underground engineering includes: four vertically arranged reaction walls defining a square reaction space, and a base mounted at a lower end opening of the wall; and a row of horizontally arranged
(Continued)

stress loading plates at a side of each wall close to the reaction space, and a reaction beam above this space, where the reaction beam, the stress loading plate, and the base define a loading space, and the loading space is configured for placement of a surrounding rock simulation block to be tested; the stress loading plate capable of moving horizontally in a direction of the reaction wall, and the reaction beam capable of moving in a vertical direction, so as to load the surrounding rock simulation block; and the stress loading plate and the reaction beam being driven by linear motion units for movement.

8 Claims, 3 Drawing Sheets

(51) Int. Cl.
  *G01M 7/08* (2006.01)
  *G01M 17/007* (2006.01)
  *G01N 3/30* (2006.01)
  *G01N 3/303* (2006.01)
  *G01N 3/307* (2006.01)

(52) U.S. Cl.
  CPC .......... *G01M 17/0078* (2013.01); *G01N 3/30* (2013.01); *G01N 3/303* (2013.01); *G01N 3/307* (2013.01)

(58) Field of Classification Search
  USPC ....................................................... 73/12.01
  See application file for complete search history.

(56) References Cited

U.S. PATENT DOCUMENTS

| | | | | |
|---|---|---|---|---|
| 11,860,135 B2* | 1/2024 | Guo | .......................... | G01N 3/12 |
| 2015/0338549 A1* | 11/2015 | Li | .......................... | G01V 20/00 |
| | | | | 703/6 |
| 2019/0078987 A1* | 3/2019 | Zhang | .................... | G01N 33/24 |
| 2021/0389219 A1* | 12/2021 | Cheng | .................... | G01N 33/24 |
| 2022/0349147 A1* | 11/2022 | Li | .......................... | E21F 17/00 |

FOREIGN PATENT DOCUMENTS

| | | | | |
|---|---|---|---|---|
| CN | 101539491 A | * | 9/2009 | |
| CN | 202584472 U | * | 12/2012 | |
| CN | 103744129 A | * | 4/2014 | ............ G01V 11/00 |
| CN | 108124460 A | * | 6/2018 | ............ G01N 3/064 |
| CN | 108254205 A | * | 7/2018 | ............. G01M 7/02 |
| CN | 108872530 A | * | 11/2018 | ............. E21B 49/00 |
| CN | 109026058 A | * | 12/2018 | |
| CN | 110455171 A | * | 11/2019 | ............... G01B 5/30 |
| CN | 111188622 A | * | 5/2020 | ............. E02D 33/00 |
| CN | 114722614 A | * | 7/2020 | |
| CN | 112083145 A | * | 12/2020 | ............ G01N 33/24 |
| CN | 114459789 A | * | 5/2022 | |
| CN | 116466064 B | * | 9/2023 | |
| WO | WO-2015103720 A1 | * | 7/2015 | ............. G01V 11/00 |

OTHER PUBLICATIONS

Dec. 16, 2020 Written Opinion issued in International Patent Application No. PCT/CN2020/101408.
Sep. 25, 2020 Office Action issued in Chinese Patent Application No. 202010191258.X.

* cited by examiner

PLATFORM, SYSTEM AND METHOD FOR SIMULATING CRITICAL ROCK COLLAPSE OF SURROUNDING ROCK IN UNDERGROUND ENGINEERING

TECHNICAL FIELD

The present invention belongs to the technical field of geotechnical engineering, in particular to a platform, system, and method for simulating critical rock collapse of surrounding rock in underground engineering.

BACKGROUND

In China, with the booming of infrastructure construction such as transportation, energy, and hydraulic engineering, underground construction represented by tunnels, underground powerhouses, underground complexes, and the like has come into high-speed period of development. The critical rock collapse of surrounding rock in underground engineering is a major threat to safety construction of underground engineering. Since 2005, more than 300 cases of critical rock collapse have been reported, ranging from mechanical damage to project delay, and even more serious casualties and heavy economic losses. The theoretical and technical challenges to disaster prevention and control research are unclear evolution mechanism and lack of reliable disaster source positioning and forecasting and early warning equipment for the critical rock collapse of surrounding rock.

As far as the inventor knows that there is no simulation test instrument for the critical rock collapse of surrounding rock in underground engineering at home and abroad currently, and it is unable to provide a reliable experimental platform for new theories and new industrial research, which is the major factor severely limiting the revealing of disaster evolution mechanism and the development of positioning and early warning technologies.

SUMMARY

The present invention aims to provide a platform, system, and method for simulating critical rock collapse of surrounding rock in underground engineering, which can realize simulation tests for the collapse mechanism and law of critical rock collapse of surrounding rock in underground engineering.

In order to achieve the above objective, a first aspect of the present invention provides a platform for simulating critical rock collapse of surrounding rock in underground engineering, including four vertically arranged reaction walls. The reaction walls define a square reaction space, and a base is mounted at a lower end opening of the reaction wall.

A row of horizontally arranged stress loading plates are disposed at a side of each reaction wall close to the reaction space, and a reaction beam is disposed above the reaction space; and the reaction beam, the stress loading plate, and the base define a loading space, and the loading space is configured for placement of a surrounding rock simulation block to be tested.

The stress loading plate can move horizontally in a normal direction of the reaction wall, and the reaction beam can move in a vertical direction, so as to load the surrounding rock simulation block. The stress loading plate and the reaction beam are respectively driven by linear motion units for movement.

As a further limitation to the first aspect of the present invention, an opening is provided on the base, a lower part of the base is provided with a basement, an arch is disposed in the basement, and the arch can be lifted in a vertical direction to transfer the arch between the basement and the loading space.

As a further limitation to the first aspect of the present invention, there are a plurality of the arches, the plurality of arches can be lifted in a vertical direction separately, a vertically arranged lifting mechanism is disposed between the arch and a lower bottom surface of the basement, and the lifting mechanism is configured to drive the arch to lift.

A second aspect of the present invention provides a system for simulating critical rock collapse of surrounding rock in underground engineering, including the platform for simulating critical rock collapse of surrounding rock in underground engineering, and further including a simulation system. The simulation system includes a holographic projection device, a control device, and the surrounding rock simulation block. A sensor is mounted in the surrounding rock simulation block, the sensor is configured to transmit information of the surrounding rock simulation block when being loaded to the control device, a three-dimensional model of the surrounding rock simulation block is prestored in the control device, and the control device can change the three-dimensional model according to the information from the sensor.

The holographic projection device can complete projection of the three-dimensional model in space according to the information transmitted by the control device.

A third aspect of the present invention provides a test method for simulating critical rock collapse of surrounding rock in underground engineering, including:

starting a control device to control stress loading plates to synchronously advance and arches to synchronously rise to form a semi-enclosed space together with the base;

prefabricating a surrounding rock simulation block in the semi-enclosed space, burying a sensor in rock mass, connecting the sensor and the control device to start to obtain internal displacement and stress state information of the rock mass, and after the prefabrication is completed, performing routine maintenance, and waiting for a material strength to meet design requirements;

mounting and starting a multi-physics field information monitoring device such as an infrared camera and an acoustic emission monitor at a set location, and starting a holographic projection device to project an initial state of a rock mass structure of the surrounding rock simulation block;

controlling the stress loading plate to apply a stress load to the surrounding rock simulation block by layers with a stable applied pressure, waiting for multi-physics field information of the surrounding rock simulation block to stabilize again, and then starting a next step;

drilling a hole above an arch contour line of the surrounding rock simulation block, burying a blasting simulation device in the surrounding rock simulation block and connecting the blasting simulation device to the control device, simulating a single blasting vibration, and meanwhile successively sinking a lifting arch to a basement in a simulated excavation direction;

before and after the sinking of the lifting arch each time, monitoring a multi-physics field state change process of the rock mass structure, and after a multi-physics field state is stable, raising the sunk lifting arch to a centimeter below a rock surface to prevent casualties and instrument damage caused by rock collapse; and starting a next cycle of excavation simulation and monitoring until all excavation is completed.

The foregoing one or more technical solutions have the following beneficial effects:

1. With the cooperation of the stress loading plate and the reaction beam, the physical test simulation of real-scale rock mass structure excavation is realized at a three-dimensional level.

2. The mechanical effect of displacement constraint release and the vibration effect of blasting in an excavation process of underground engineering is simulated really, and a gradual excavation dynamic process of underground engineering is accurately controlled, so as to accurately simulate an internal dynamic response of surrounding rock in the excavation process.

3. The stress loading plates disposed in layers can provide a hardware basis for accurate simulation of ground stress gradient distribution, and by controlling the stress loading plate to stretch, steps for walking and a platform for standing are provided for test personnel to enter a test area to carry out operations such as sensing element burying.

4. The holographic projection device is used to comprehensively display an excavation process of underground engineering and a development-instability dynamic process of a critical rock structure, which is more intuitive and easy to understand compared with data post-processing analysis of two-dimensional charts of traditional computers, thus providing a technical support for the thorough understanding and deep digging of test laws and for the prediction and early warning of critical rock disasters.

BRIEF DESCRIPTION OF THE DRAWINGS

The accompanying drawings constituting a part of the present invention are used for providing further understanding for the present invention. Exemplary embodiments of the present invention and descriptions thereof are used for explaining the present invention and do not constitute a limitation to the present invention.

Figure 1:
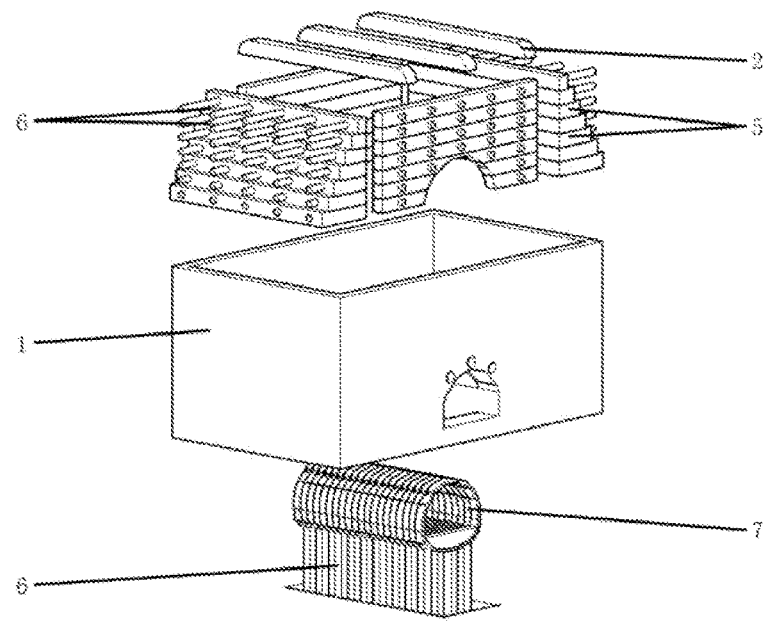
FIG. 1 is a schematic view of partial structures in Embodiment 1 of the present invention.

In the drawings: 1. reaction wall, 2. reaction beam, 3. base, 4. basement, 5. stress loading plate, 6. hydraulic cylinder, 7. arch, 8. blasting simulation device, 9. data analysis and control center, 10. outer wall, 11. air partition, and 12. holographic projection device.

DETAILED DESCRIPTION

It should be noted that, the following detailed descriptions are all exemplary, and are intended to provide further descriptions of the present invention. Unless otherwise specified, all technical and scientific terms used herein have the same meaning as commonly understood by a person of ordinary skill in the art to which the present invention belongs.

It should be noted that terms used herein are only for describing specific implementations and are not intended to limit exemplary implementations according to the present invention. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

For convenience of description, the words "above", "below", "left", and "right" only indicate directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on the present invention.

Embodiment 1

Figure 2:
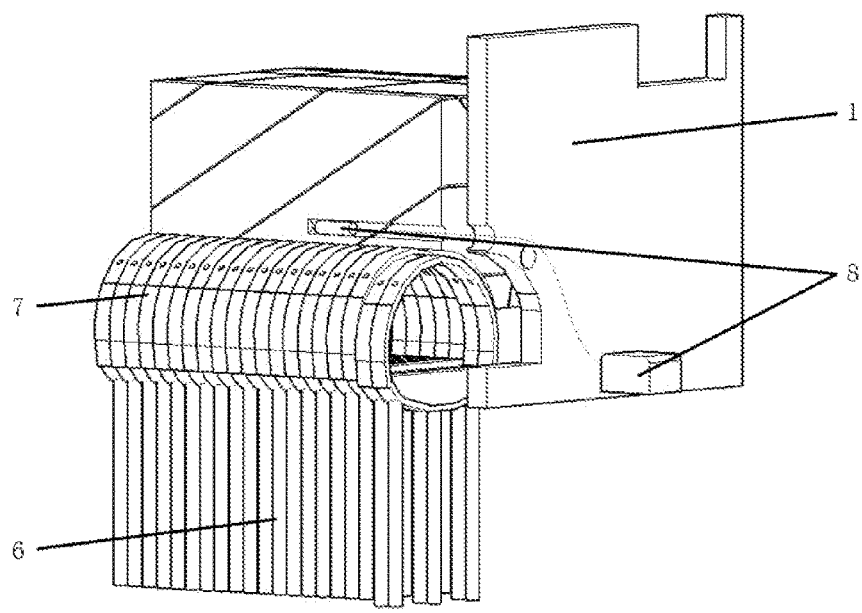
FIG. 2 is a schematic view of partial structures such as an arch and a lifting mechanism in Embodiment 1 of the present invention.
Figure 3:
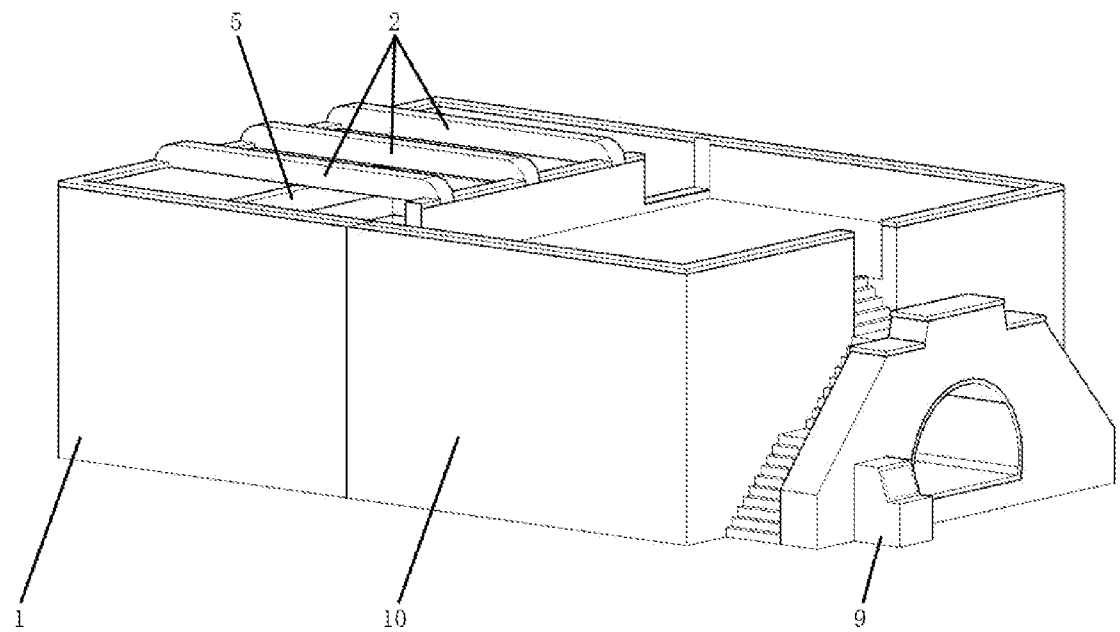
FIG. 3 is an axonometric view of an overall structure in Embodiment 2 of the present invention.
Figure 4:
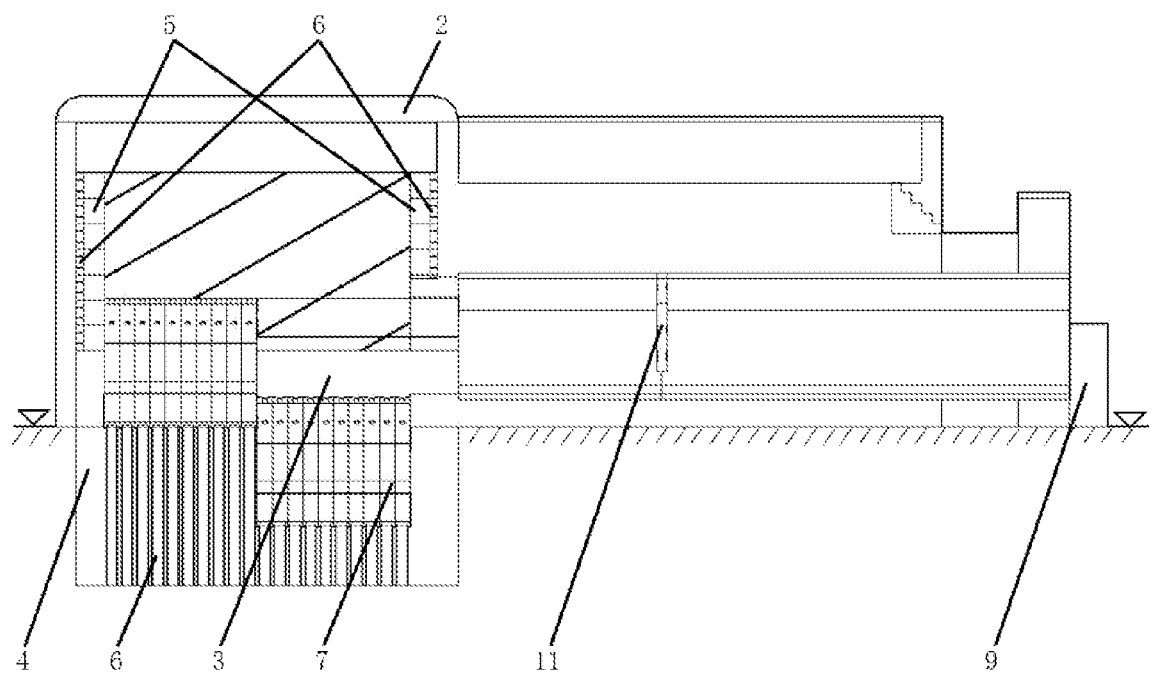
FIG. 4 is a sectional view of the overall structure in Embodiment 2 of the present invention.
Figure 5:
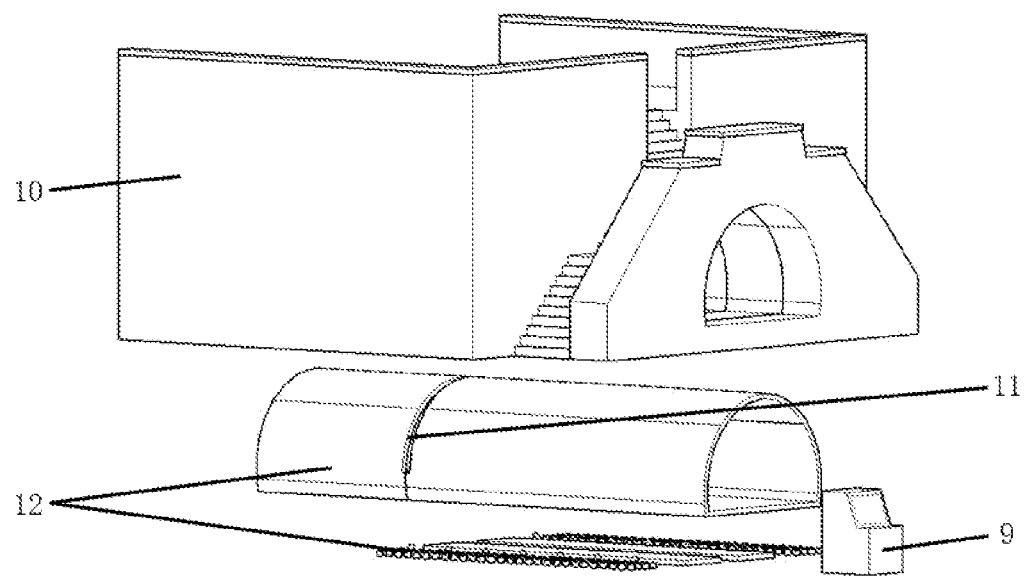
FIG. 5 is a schematic view of partial structures such as a holographic projection device in Embodiment 2 of the present invention.

This embodiment provides a platform for simulating critical rock collapse of surrounding rock in underground engineering, as shown in FIGS. 1-2, including four vertically arranged reaction walls 1. The reaction walls 1 define a square reaction space, and a base 3 is mounted at a lower end opening of the reaction wall 1.

A row of horizontally arranged stress loading plates 5 are disposed at a side of each reaction wall 1 close to the reaction space, and a reaction beam is disposed above the reaction space. The reaction beam, the stress loading plate 5, and the base 3 define a loading space, and the loading space is configured for placement of a surrounding rock simulation block to be tested.

The stress loading plate 5 can move horizontally in a normal direction of the reaction wall 1, and the reaction beam can move in a vertical direction, so as to load the surrounding rock simulation block.

The stress loading plate 5 and the reaction beam are respectively driven by linear motion units for movement.

Each group of stress loading plates 5 include a plurality of layers of horizontally arranged loading plate members, and each loading plate member is driven by one linear motion unit to realize layered loading of the surrounding rock simulation block in a horizontal direction.

An opening is provided on the base 3, a lower part of the base 3 is provided with a basement 4, an arch 7 is disposed in the basement 4, and the arch 7 can be lifted in a vertical direction to transfer the arch 7 between the basement 4 and the loading space.

There are a plurality of the arches 7, the plurality of arches 7 can be lifted in a vertical direction respectively, a vertically arranged lifting mechanism is disposed between the arch 7 and a lower bottom surface of the basement 4, and the lifting mechanism is configured to drive the arch 7 to lift.

A shape of the arch 7 is set as that an upper contour shape of the arch 7 is the same as a lower contour shape of the surrounding rock simulation block, and the arch 7 is configured to support the surrounding rock simulation block.

There are a plurality of the reaction beams, and a distance between adjacent reaction beams is adjustable.

Embodiment 2

This embodiment provides a system for simulating critical rock collapse of surrounding rock in underground engineering, as shown in FIGS. 1-5, including a reaction wall 1, a reaction beam 2, a base 3, a basement 4, a stress loading plate 5, a hydraulic cylinder 6, a lifting arch 7, a blasting simulation device 8, a data analysis and control center 9, an outer wall 10, an air partition 11, and a holographic projection device 12. The reaction wall 1, the base 3, and the basement 4 jointly form a semi-enclosed space with an open top, into which a semi-enclosed space with an open top jointly formed by the stress loading plate 5 and the lifting arch 7 is nested to internally accommodate a prefabricated surrounding rock structure. The outer wall 10 is built in an axial extension direction by relying on a front side surface of the reaction wall 1. The holographic projection device 12 is contained in the outer wall 10.

The reaction force walls 1 are arranged on front, rear, left, and right sides, and overlap each other. The reaction beam 2 is mounted on a top of the reaction wall 1, with two ends respectively overlapped on tops of the reaction walls 1 at the front and rear, and can move left and right along a top edge of the reaction wall 1. The base 3 is surrounded by the reaction wall 1, and the base 3 is hollowed out partially along a longitudinal axis of symmetry. A width of the hollowed-out area is slightly larger than a left-right width of the lifting arch 7. The basement 4 is located below the base 3, communicated with the hollowed-out area of the base 3, and has a length and a width that are consistent with the hollowed-out area, and a depth that is the sum of a height of the lifting arch 7 and a height of the hydraulic cylinder 6 after contraction.

The stress loading plates 5 are divided into stress loading plates and vertical stress loading plates. A plurality of rows of hydraulic cylinders 6 are mounted on inner surfaces of the reaction walls 1 at the four sides in a horizontal row-column direction. A piston rod of the hydraulic cylinder 6 points into an enclosed area in a normal direction of the reaction wall 1. A top of the piston rod is connected to a back of the stress loading plate to drive the stress loading plate to move in the normal direction of the reaction wall 1. The stress loading plates are laid in layers in a horizontal direction. A hydraulic cylinder 6 with a piston rod pointing downwards is mounted on a lower surface of the reaction beam 2, and the piston rod is connected to a back of a vertical loading plate to drive the vertical loading plate to move in a vertical direction up and down.

A bottom surface of the basement 4 is provided with a plurality of rows of hydraulic cylinders 6 distributed in a left-right direction. The hydraulic cylinder 6 is buried in the bottom surface of the basement 4 and connected upwards to the lifting arch 7 to support the lifting arch to move vertically through the basement 4 and the base 3. The blasting simulation device 8 is an independent carrying structure buried in the prefabricated surrounding rock.

The data analysis and control center 9 adopts a high-performance computer as a carrier, on which control software for various instrument parts and processing and analysis software for acquired multivariate data are mounted to realize dynamic control of a whole test process and real-time state analysis of a test body.

The outer wall 10 is built by relying on a front end side surface of the reaction wall 1 to extend forwards. The air partition 11 is disposed inside the outer wall 10 to block dust generated by the test within the reaction wall 1 and a rear half of the outer wall 10. The holographic projection device 12 is arranged in a front half in the outer wall 10. The holographic projection device 12 is arranged axially in a front-rear direction, and projects in an area near a central axis to generate a rock mass structure model. The holographic rock mass model changes synchronously with a test operation, so as to dynamically display surrounding rock excavation and critical rock development-instability processes.

Embodiment 3

This embodiment provides a test method for simulating critical rock collapse of surrounding rock in underground engineering, including:

A. A data analysis and control center 9 is started to control stress loading plates 5 to synchronously advance and lifting arches 7 to synchronously rise to form a semi-enclosed space together with the base 3.

B. A cubic rock mass structure is prefabricated in the semi-enclosed space, and a sensing element such as a pressure cell and a gyroscope is buried into rock mass according to design requirements of a test plan. The sensing element is connected to the data analysis and control center 9 to start to acquire internal displacement and stress state information of the rock mass. After the prefabrication is completed, routine maintenance is performed, waiting for a material strength to meet design requirements.

C. A multi-physics field information monitoring device such as an infrared camera and an acoustic emission monitor is mounted and started at a set location, and an air partition 11 and a holographic projection device 12 are started to project an initial state of a rock mass structure.

D. According to a design ground stress environment, a hydraulic cylinder 6 is controlled to push the stress loading plate 5 to apply a stress load to the rock mass by layers, with an applied pressure kept stable, waiting for multi-physics field information of the rock mass to stabilize again, and then a next step is started.

E. A hole is drilled above an arch contour line of the rock mass, and a blasting simulation device 8 is buried and connected to the data analysis and control center 9. A single blasting vibration is simulated, and meanwhile a lifting arch 7 is successively sunk to a basement 4 in a simulated excavation direction (the quantity of arches sunk each time is determined by an excavation simulation plan).

F. Before and after the sinking of the lifting arch 7 each time, a multi-physics field state change process of the rock mass structure is monitored. After a multi-physics field state is stable, the sunk lifting arch 7 is raised to a centimeter below a rock surface to prevent casualties and instrument damage caused by rock collapse.

G. A next cycle of excavation simulation and monitoring is started until all excavation is completed.

H. In a whole test process, data results acquired by the sensing element and monitoring equipment in real time are analyzed and dug to analyze state changes of the rock mass structure; and excavation and surrounding rock exposure is displayed in the holographic projection model synchronously with test excavation, a critical rock structure is specially identified according to analysis results, and its state parameter change trend is displayed, thus laying a data foundation for revealing evolution law of critical rock disasters of surrounding rock, and realizing positioning and quantitative identification of the critical rock structure and disaster early warning.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. A test method for simulating critical rock collapse of surrounding rock in underground engineering utilizing a system for simulating the critical rock collapse of the surrounding rock in underground engineering, wherein
the system comprises:
a platform for simulating the critical rock collapse of the surrounding rock in underground engineering, the platform comprising:
four reaction walls, being arranged vertically, wherein the four reaction walls define a square reaction space, and a base is mounted at a lower end opening of the four reaction walls;
a row of horizontally arranged stress loading plates disposed at a side of each of the four reaction walls facing the reaction space; and
a reaction beam disposed above the reaction space, wherein
the reaction beam, the stress loading plates, and the base define a loading space, the loading space being configured for placement of a surrounding rock simulation block to be tested,
the stress loading plates are configured to move horizontally in a normal direction of the four reaction walls, and the reaction beam is configured to move in a vertical direction, so as to load the surrounding rock simulation block, and
the stress loading plates and the reaction beam are respectively driven by linear motion units for movement; and
a simulation system comprising:
a holographic projection device;
a control device; and
the surrounding rock simulation block, wherein
a sensor is mounted in the surrounding rock simulation block, the sensor being configured to transmit information of the surrounding rock simulation block when being loaded to the control device,
a three-dimensional model of the surrounding rock simulation block is pre-stored in the control device,
the control device is configured to change the three-dimensional model according to the information from the sensor, and
the holographic projection device is configured to complete projection of the three-dimensional model in space according to the information transmitted by the control device, the test method comprising:
starting the control device to control the stress loading plates to synchronously advance and arches to synchronously rise to form a semi-enclosed space together with the base;
prefabricating the surrounding rock simulation block in the semi-enclosed space, burying the sensor in rock mass, connecting the sensor and the control device to start to obtain internal displacement and stress state information of the rock mass, performing routine maintenance after the prefabrication is completed, and waiting for a material strength to meet design requirements;
mounting a monitoring device at a set position, and starting the holographic projection device to project an initial state of a rock mass structure of the surrounding rock simulation block;
controlling the stress loading plates to apply a stress load to the surrounding rock simulation block by layers with a stable applied pressure, waiting for multi-physics field information of the surrounding rock simulation block to stabilize again, and then starting a next step;
drilling a hole above an arch contour line of the surrounding rock simulation block, burying a blasting simulation device in the surrounding rock simulation block and connecting the blasting simulation device to the control device, simulating a single blasting vibration, and meanwhile successively sinking a lifting arch to a basement in a simulated excavation direction;
before and after the sinking of the lifting arch each time, monitoring a multi-physics field state change process of the rock mass structure, and after a multi-physics field state is stable, raising the sunk lifting arch to a set distance below a rock surface to prevent casualties and instrument damage caused by rock collapse; and
starting a next cycle of excavation simulation and monitoring until all excavation is completed.

2. The test method according to claim 1, wherein each group of the stress loading plates comprises a plurality of layers of horizontally arranged loading plate members, and each loading plate member is respectively driven by one of the linear motion units to realize layered loading of the surrounding rock simulation block in a horizontal direction.

3. The test method according to claim 1, wherein
an opening is provided on the base,
a lower part of the base is provided with the basement,
the lifting arch is disposed in the basement, and
the lifting arch is configured to be lifted in the vertical direction to transfer the lifting arch between the basement and the loading space.

4. The test method according to claim 3, wherein the lifting arch is a plurality of the arches, the plurality of the arches being configured to be lifted in the vertical direction separately, wherein
a vertically arranged lifting mechanism is disposed between the plurality of lifting arches and a lower bottom surface of the basement, and
the lifting mechanism is configured to drive the plurality of lifting arches to lift.

5. The test method according to claim 4, wherein
a shape of each lifting arch has an upper contour shape that is the same as a shape of a lower contour of the surrounding rock simulation block, and
the plurality of lifting arches are configured to support the surrounding rock simulation block.

6. The test method according to claim 1, wherein
the reaction beam is a plurality of reaction beams, and
a distance between adjacent reaction beams of the plurality of reaction beams is adjustable.

7. The test method according to claim 1, wherein
an outer wall is disposed on a side of each of the four reaction walls respectively, and
the holographic projection device is disposed in a space defined by the outer walls.

8. The test method according to claim 1, wherein the blasting simulation device is disposed in the surrounding rock simulation block, and the blasting simulation device is configured to complete simulation of explosive blasting at the surrounding rock simulation block through explosion.

* * * * *